Figure 1:
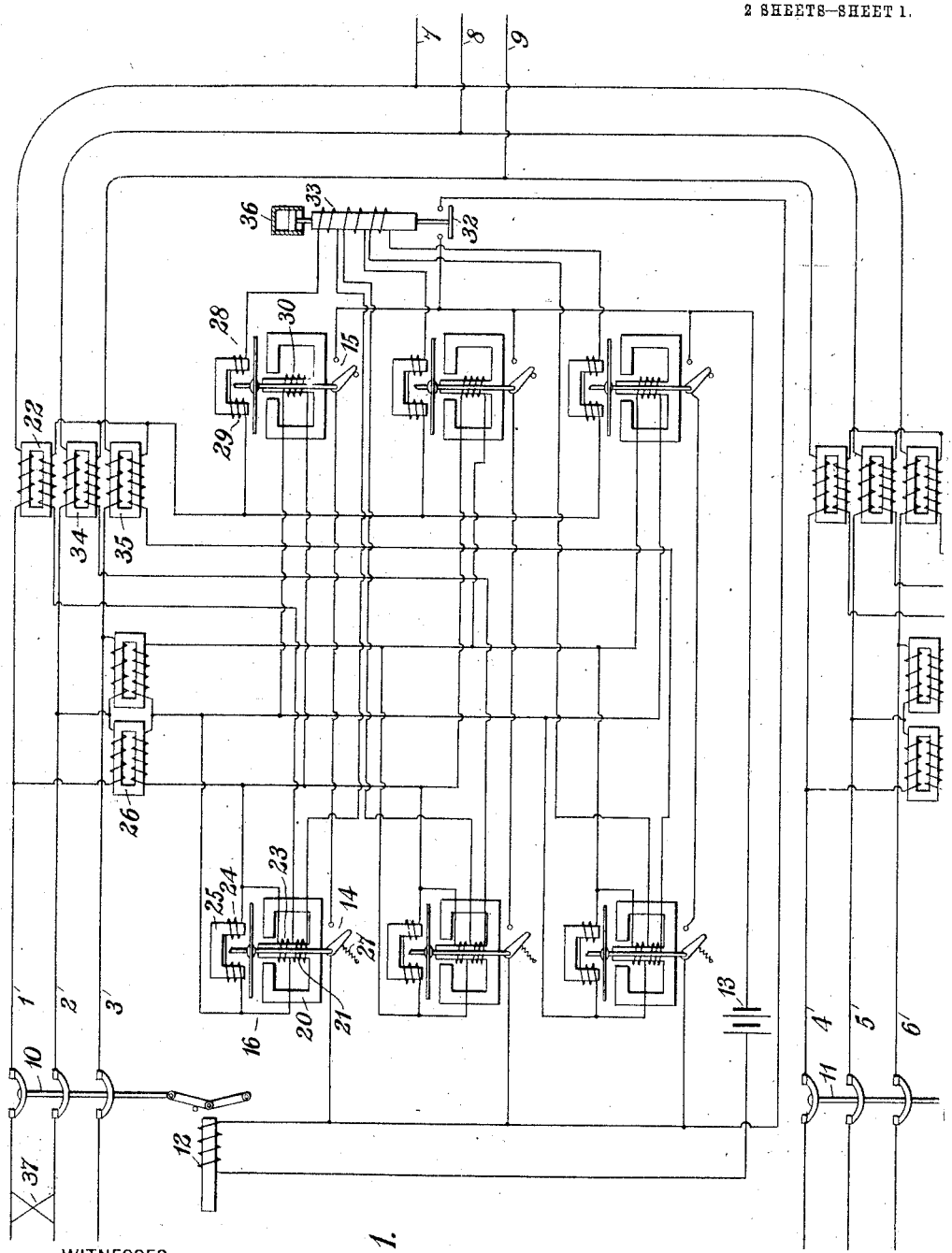

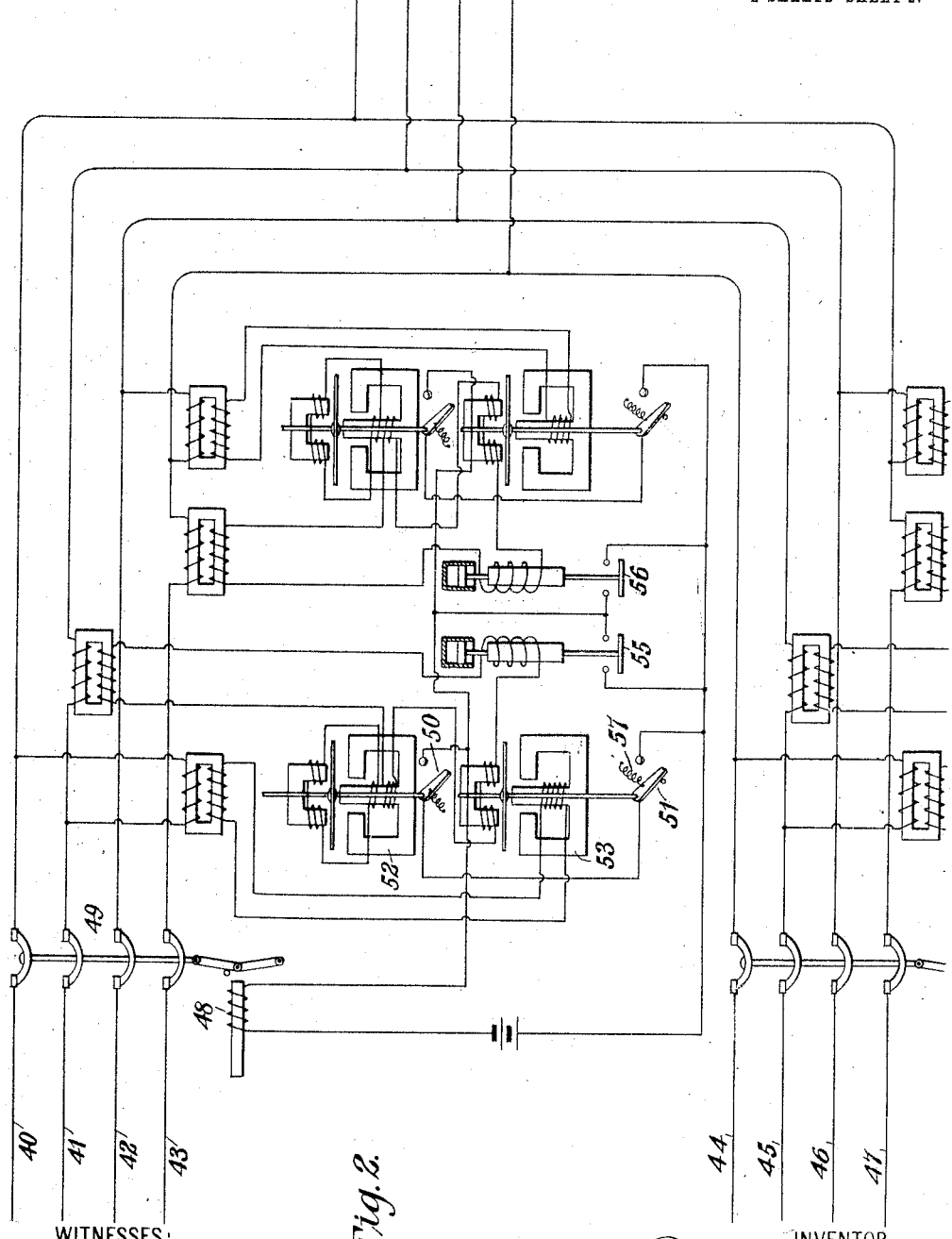

UNITED STATES PATENT OFFICE.

PAUL MacGAHAN, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

MEANS FOR PROTECTING ELECTRICAL CIRCUITS.

977,648.   Specification of Letters Patent.   Patented Dec. 6, 1910.

Application filed January 10, 1908. Serial No. 410,217.

*To all whom it may concern:*

Be it known that I, PAUL MacGAHAN, a citizen of the United States, and a resident of Wilkinsburg, in the county of Allegheny and State of Pennsylvania, have invented a new and useful Improvement in Means for Protecting Electrical Circuits, of which the following is a specification.

My invention relates to protective devices for electrical distributing systems, and particularly to such devices as are adapted to protect systems, comprising parallel transmission lines, from injuries that might result from overloads or from reversals of the flow of energy therein.

The object of my invention is to provide a system of the character indicated in which an injured line will become disconnected from the remainder of the system more promptly when it is traversed by energy in the reverse of normal direction than when traversed by an abnormal amount of energy in the normal direction.

In order to insure the maintenance and reliability of the service rendered by electrical systems, it is a common expedient to employ parallel transmission lines, and it has heretofore been sought to so protect a system of this character that, upon the occurrence of an injury to one line it would become automatically disconnected from the remainder of the system without disturbing the other lines. This result has been accomplished, only imperfectly however, because, even though, upon the occurrence of a short-circuit or ground upon one line, current will traverse a portion of that line in the reverse of normal direction, an abnormal amount of energy may, at the same time, and due to the same cause, traverse the other line in the normal direction and thus cause the circuit-breakers therein to open as promptly as those in the injured line. For instance, let us consider the most common system of protection heretofore in practical use, in which ordinary overload relays are associated with circuit-breakers in each transmission line at the power house, and in which means are provided at each sub-station for opening circuit-breakers in each line, either upon the occurrence of an overload, or upon reversal of the flow of energy in the line.

One device which has heretofore been provided for installation at the sub-station end of the parallel transmission lines constitutes the subject-matter of an application, Serial No. 259,388, filed May 8, 1905, by Frank Conrad, and assigned to the Westinghouse Electric & Manufacturing Company, the said device being actuated by the algebraic sum of forces respectively proportional to the amount of energy and the square of the amount of current traversing the circuit. If the current traversing a circuit in connection with which the said device is employed exceeds a predetermined amount, the torque that is dependent upon the current alone may exceed that which is dependent upon the product of current, voltage and power factor (which may at times be small on account of the decrease in voltage and power factor) by such an amount as to effect operation of the device and cause the circuit-breaker to open. If, for any reason, the direction of the drop of potential in the circuit becomes reversed, the two torques act in the same direction, and if the total torque exceeds a predetermined amount, the device will operate and cause the circuit-breaker to open. While the said device supplied the demand for a relay that should operate when the amount of current taken from a system becomes so large as to cause a very material reduction in the voltage, and while it may also be so arranged that it will operate to cause the circuit-breakers to open when the circuit is traversed by a smaller amount of energy in the reverse of normal direction than in the normal direction, when short-circuits or low resistance grounds occur near a sub-station and cause very low voltages at the sub-station, the device associated with an uninjured line may operate by reason of an overload therein substantially simultaneously with the operation of the device associated with the injured line, which operates owing to a reversal of the flow of energy. Thus, not only the disabled line, but the uninjured line as well, may become disconnected from the remainder of the system.

According to the present invention, the circuit-breakers are caused to open more promptly when the circuit is traversed by energy in the reverse of normal direction than when an abnormal amount of current persists in a line for a predetermined length of time.

To this end, the present system provides two switches for governing the operation of the circuit-breakers in each line, both switches being closed only when energy traverses the circuit in the reverse of normal direction. One switch is operated by means of the above-mentioned device invented by Frank Conrad, and the other switch is operated by means of a wattmeter device. To effect operation of the circuit-breakers when the current traversing the circuit exceeds a predetermined amount, a third switch that is connected in shunt to the aforesaid switches is closed by means of a time limit overload device. Thus, by the present arrangement, if a ground or short-circuit occurs upon one of the lines near a sub-station, the circuit-breakers at the sub-station, in the disabled line, will be operated because of the reversal of the flow of energy in that line, while the over-load in the uninjured line resulting from the injury to the other line will not cause the circuit-breakers in the uninjured line to open unless the overload conditions persist for a predetermined length of time.

The accompanying drawings illustrate diagrammatically systems embodying my invention, that of Figure 1 being a three-phase system and that of Fig. 2 a two-phase system.

The system of Fig. 1 comprises two parallel transmission lines 1—2—3 and 4—5—6 that feed at a sub-station a suitable distributing circuit 7—8—9, multiple-pole circuit-breakers 10 and 11 being interposed respectively in the transmission lines at the sub-station.

Each transmission line is protected by a similar system of relays, and it has, therefore, been deemed necessary to illustrate and describe completely only the system employed in connection with one of the lines.

The circuit-breaker 10 is tripped by an electromagnetic device comprising a magnet winding 12 the circuit of which includes a battery 13, or any other suitable source of current, and three pairs of similar switches 14 and 15 that are disposed in parallel circuit and are employed to govern the circuit of the magnet winding 12. One pair of the switches 14 and 15 is provided for each phase of the distributing system, and, since the circuit arrangements and the devices provided for each phase are substantially identical, they will be described only with reference to one of the phases. The switch 14 is operated by means of a device 16 constructed substantially like that set forth in Patent No. 853,218, granted May 14, 1907, to the Westinghouse Electric & Manufacturing Company as assignee of William Bradshaw, except that the windings are so arranged that the principles set forth in the above-mentioned application of Frank Conrad may be utilized. The said instrument comprises a two-part magnetizable core, the core part 20 thereof being provided with a winding 21 the energizing current for which is proportional in amount to that traversing line conductor 1 and is supplied by a series transformer 22. The core part 20 is also provided with a winding 23 that is connected in closed circuit with a winding 24 upon core part 25 of the instrument, a voltage being impressed upon the winding 24, which is proportional to that of the transmission line 1—2—3, by means of a shunt transformer 26.

The device 16 is actuated, as before explained, by the algebraic sum of two torques, respectively proportional to the square of current traversing the circuit and to the product of the current, voltage and power factor of the circuit, so that the switch 14 will be closed against the action of a spring 27, either when the amount of energy traversing the transmission line 1—2—3 exceeds a predetermined value, or when energy traverses the said line in the reverse of normal direction. The switch 15 is operated by means of a wattmeter device 28 constructed like that set forth in Patent No. 853,218, current being supplied to winding 29 thereof, which is proportional in amount to that which traverses line conductor 1, by means of the series transformer 22, and to winding 30 thereof, which is proportional in amount to the voltage of one phase of the transmission line 1—2—3, by means of the shunt transformer 26. The instrument 28 serves to maintain the switch 15 open when energy traverses transmission line 1—2—3 in the normal direction, and to close the said switch when energy traverses the transmission line 1—2—3 in the reverse of normal direction. Thus it is seen that both of the switches 14 and 15 are closed only when energy traverses the transmission line in the reverse of normal direction, and when this occurs, the circuit of the magnet winding 12 is established and the circuit-breaker 10 is caused to open, it being noted that no means are provided for delaying the operations of the devices 16 and 28 and, consequently, a disabled line will be promptly disconnected at the sub-station end upon a reversal of the direction of the flow of energy therein.

Connected in shunt to the switches 14 and 15, so as to control the circuit of the magnet winding 12 independently thereof, is another switch 32 that is operated by means of electro-magnet windings 33, one for each phase, the energizing currents for which are respectively proportional in amount to those traversing line conductors 1, 2, and 3, and are supplied by series transformers 22, 34, and 35, the switch 32 being so delayed in its operation by a dash-pot 36, that it may not close upon the occurrence of a sudden overload, but can be closed only when an abnormal amount of current persists in the transmission line for more than a predetermined length of time. It will be understood also that the structure of the device is such that the period of time during which overload conditions must exist before the switch 32 will be closed will vary substantially inversely as the amount of current traversing the operating magnet windings 33 varies.

In order that the operation of the system may be understood, let it be assumed that a short-circuit occurs at 37 on the transmission line 1—2—3 near the sub-station in which the present system is installed. Energy will then be delivered to the sub-station through the transmission line 4—5—6 and will traverse the line 1—2—3 toward the short-circuit at 37, in the reverse of normal direction, the amount of energy, of course, being large on account of the short-circuit. The devices 16 and 28 will immediately cause the switches 14 and 15 to close and thereupon the circuit-breaker 10 will be promptly opened. It will be understood that the said line will be disconnected from the remainder of the system at the main station, by means of ordinary over-load devices, in the usual manner. The line 4—5—6, being protected by a system similar to that shown in connection with the line 1—2—3, a switch in the said similar system corresponding to switch 32 will begin to close on account of the increased amount of current traversing the line 4—5—6 caused by the short-circuit at 37. However, because of the slow action of the said switch it cannot close until the switches 14 and 15 have closed and caused the circuit-breaker 10 to disconnect the disabled line from the remainder of the system, thereby affording a relief from the abnormal conditions upon the uninjured transmission line 4—5—6.

In the system of Fig. 2, the invention is shown as employed in connection with a two-phase system, comprising parallel transmission lines 40—41—42—43 and 44—45—46—47, the circuit of controlling magnet winding 48 for a circuit-breaker 49 in the transmission line 40—41—42—43 being governed by two pairs of switches 50 and 51, one pair for each of the systems. The switches 50 and 51 are operated by devices 52 and 53, respectively, the latter of which is a wattmeter, while the former is an ammeter device, operating according to the principles set forth in Patent No. 794,295, and constructed substantially like the instrument 16 of Fig. 1. The system differs further from that of Fig. 1, in that two overload, inverse time-limit relay switches 55 and 56 are employed, one for each phase of the system, and also in that springs 57 are provided for exerting forces tending to close the switches 51, in order to make sure that the said switches will be closed upon a reversal of the direction of the flow of energy in the system and to avoid relying upon the comparatively small torques that may be exerted by the instruments 53 upon the occurrence of a low voltage caused by a short-circuit upon the transmission line.

It will be readily understood that many other modifications than those that have been illustrated and described may be made in the system without altering its mode of operation or departing from the spirit of the invention, and I desire that all such modifications shall be included within its scope.

I claim as my invention:

1. The combination with an electrical circuit, circuit-breakers therein, and actuating means for the circuit-breakers, of two switches for controlling the said actuating means, one of which is normally open, means for closing the normally open switch when the circuit is traversed by energy in the reverse of normal direction and by more than a predetermined amount of current, and means for opening the other switch when the circuit is traversed by energy in the normal direction.

2. The combination with an electrical circuit, circuit-breakers therein, and actuating means for the circuit-breakers, of two switches for controlling the said actuating means, means for closing one of the switches when the circuit is traversed by energy in the reverse of normal direction, and means for maintaining the other switch open when the circuit is traversed by energy in the normal direction and for closing it when the circuit is traversed by energy in the reverse of normal direction.

3. The combination with an electrical circuit, circuit-breakers therein, and actuating means for the circuit-breakers, of two switches for controlling the said actuating means, means for closing one of the switches when the circuit is traversed by energy in the reverse of normal direction or by more than a predetermined amount of current, and means for maintaining the other switch open when the circuit is traversed by energy in the normal direction and for closing it when the circuit is traversed by energy in the reverse of normal direction, and a third switch for controlling the circuit-breaker-actuating means that is operated only after the circuit has been traversed by an abnormal amount of current for more than a predetermined length of time.

4. The combination with an electrical circuit, circuit-breakers therein, and actuating means for the circuit-breakers, of two switches for controlling the said actuating means one of which is normally open, means for closing the normally open switch when the circuit is traversed by energy in the reverse of normal direction, and means for opening the other switch when the circuit is traversed by energy in the normal direction, and a third switch for controlling the circuit-breaker-actuating means that is operated only after the circuit has been traversed by an abnormal amount of current for more than a predetermined length of time.

5. The combination with an electrical circuit, circuit-breakers therein, and actuating means for the circuit-breakers, of two switches for controlling the said actuating means, means for closing one of the switches only when the circuit is traversed by energy in the reverse of normal direction or by more than a predetermined amount of current, and means for maintaining the other switch open when the circuit is traversed by energy in the normal direction and for closing it when the circuit is traversed by energy in the reverse of normal direction.

6. The combination with an electrical circuit, circuit-breakers therein, and actuating means for the circuit-breakers, of two switches for controlling the said actuating means, means for closing one of the switches when the circuit is traversed by energy in the reverse of normal direction, and means for maintaining the other switch open when the circuit is traversed by energy in the normal direction and for closing it when the circuit is traversed by energy in the reverse of normal direction, and a third switch for controlling the circuit-breaker-actuating means that is operated only after the circuit has been traversed by an abnormal amount of current for more than a predetermined length of time.

In testimony whereof, I have hereunto subscribed my name this 23rd day of Dec., 1907.

PAUL MacGAHAN.

Witnesses:
M. C. RYPINSHI,
BIRNEY HINES.